(12) United States Patent
Kang et al.

(10) Patent No.: US 9,233,518 B2
(45) Date of Patent: Jan. 12, 2016

(54) HYBRID POROUS STRUCTURE, METHOD OF PREPARING HYBRID POROUS STRUCTURE, SEPARATION MEMBRANE INCLUDING HYBRID POROUS STRUCTURE, AND WATER TREATMENT DEVICE INCLUDING MEMBRANE

(75) Inventors: Hyo Kang, Seoul (KR); Pil Jin Yoo, Seoul (KR); Sung Soo Han, Hwaseong-si (KR); Young Hun Kim, Gyeonggi-do (KR); Seon Ju Yeo, Gyeongsangbuk-do (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 791 days.

(21) Appl. No.: 13/469,661

(22) Filed: May 11, 2012

(65) Prior Publication Data
US 2013/0134081 A1 May 30, 2013

(30) Foreign Application Priority Data

Nov. 29, 2011 (KR) .......................... 10-2011-0126087

(51) Int. Cl.
*B01D 69/02* (2006.01)
*B01D 69/06* (2006.01)
(Continued)

(52) U.S. Cl.
CPC ................ *B32B 5/18* (2013.01); *B01D 67/003* (2013.01); *B01D 69/10* (2013.01); *B01D 69/105* (2013.01);
(Continued)

(58) Field of Classification Search
CPC ........ B01D 67/003; C08J 9/365; B05D 3/107
See application file for complete search history.

(56) References Cited

U.S. PATENT DOCUMENTS 6,680,013 B1* 1/2004 Stein et al. ...................... 264/44
2004/0262790 A1* 12/2004 Fu et al. ......................... 264/1.21
(Continued)

FOREIGN PATENT DOCUMENTS

CN 101919591 A 12/2010
KR 100827248 B1 5/2008
(Continued)

OTHER PUBLICATIONS

Isshiki, Yusuke et al. "Electric double-Layer Capacitance of Inverse Opal Carbon Prepared Through Carbonization of Poly(Furfuryl Alcohol) in Contact with Polymer Gel Electrolyte Containing Ionic Liquid" Polymers for Advanced Technologies, vol. 22, Issue 8, Aug. 2011, pp. 1254-1260.

(Continued)

*Primary Examiner* — Krishnan S Menon
*Assistant Examiner* — Bradley R Spies
(74) *Attorney, Agent, or Firm* — Harness, Dickey & Pierce, P.L.C.

(57) ABSTRACT

A hybrid porous structure may include a base template and an ionic polymer coating layer within the base template. The structural framework of the base template itself is non-porous. The base template fills the gaps among a plurality of imaginary spherical bodies stacked in three-dimensions as an imaginary stack. The ionic polymer coating layer is laminated on an inner surface of the base template inside the imaginary spherical bodies. The imaginary spherical bodies may have a pore in the center which is not occupied by the ionic polymer coating layer. The hybrid porous structure may include a plurality of necks, which are openings formed in a contact part where adjacent imaginary spherical bodies contact each other. The necks may be interconnected to the pores located in the center part of the imaginary spherical bodies.

17 Claims, 12 Drawing Sheets

(51) Int. Cl.
B01D 69/10 (2006.01)
B01D 69/12 (2006.01)
C02F 1/44 (2006.01)
B01D 67/00 (2006.01)
B32B 5/18 (2006.01)
C08F 2/04 (2006.01)
C08F 2/06 (2006.01)
B01D 61/00 (2006.01)

(52) U.S. Cl.
CPC ........... B01D 61/002 (2013.01); B01D 2323/24 (2013.01); B01D 2323/26 (2013.01); B01D 2325/02 (2013.01); B01D 2325/14 (2013.01); B01D 2325/16 (2013.01); Y10T 428/249955 (2015.04); Y10T 428/249956 (2015.04); Y10T 428/249958 (2015.04)

(56) References Cited

U.S. PATENT DOCUMENTS

| | | | |
|---|---|---|---|
| 2005/0133441 A1* | 6/2005 | Charkoudian | 210/500.42 |
| 2005/0145568 A1* | 7/2005 | McGinnis | 210/639 |
| 2006/0078736 A1* | 4/2006 | Fukazawa et al. | 428/407 |
| 2009/0174117 A1* | 7/2009 | Winkler et al. | 264/319 |
| 2010/0160466 A1 | 6/2010 | Elabd et al. | |
| 2010/0181253 A1 | 7/2010 | Vandezande et al. | |
| 2011/0073473 A1 | 3/2011 | Zheng et al. | |
| 2011/0073540 A1* | 3/2011 | McGinnis et al. | 210/490 |
| 2011/0274744 A1* | 11/2011 | Picart et al. | 424/445 |
| 2014/0319044 A1* | 10/2014 | Giannelis et al. | 210/321.6 |

FOREIGN PATENT DOCUMENTS

KR 20110098499 A 9/2011
WO WO 2010081884 A2 * 7/2010 .............. A61L 27/34

OTHER PUBLICATIONS

Honda, Masaki et al. "Confined Stimuli-Responsive Polymer Gel in Inverse Opal Polymer Membrane for Colorimetric Glucose Sensor" Langmuir the Acs Journal of Surfaces and Colloids, vol. 25, Issue 14, Jul. 21, 2009, pp. 8349-8356.

Tian, Shengjun et al. "Inverse Opals of Polyaniline and its Copolymers Prepared by Electrochemical Techniques" Chem. Mater., 2005, 17 (23), pp. 5726-5730.

Decher, Gero "Fuzzy Nanoassemblies: Toward Layered Polymeric Multicomposites" Gero Decher Science, 277, 29,1232-1237 (1997).

Yeo, Seon Ju et al. "Layer-by-Layer Assembly of Polyelectrolyte Multilayers in Three-Dimensional Inverse Opal Structured Templates" ACS Appl. Mater Interfaces 2012, 4, 2107-2115.

* cited by examiner

HYBRID POROUS STRUCTURE, METHOD OF PREPARING HYBRID POROUS STRUCTURE, SEPARATION MEMBRANE INCLUDING HYBRID POROUS STRUCTURE, AND WATER TREATMENT DEVICE INCLUDING MEMBRANE

CROSS-REFERENCE TO RELATED APPLICATION

This application claims priority under 35 U.S.C. §119 to Korean Patent Application No. 10-2011-0126087, filed in the Korean Intellectual Property Office on Nov. 29, 2011, the entire contents of which are incorporated herein by reference.

BACKGROUND

1. Field

This disclosure relates to a hybrid porous structure, a method of manufacturing the hybrid porous structure, a separation membrane including the hybrid porous structure, and a water treatment device including the separation membrane.

2. Description of the Related Art

A separation membrane including pores may be used to separate a material with a specific size. As a result, such a separation membrane may be applied to water treatment by using this property to remove pollutants. The separation membrane for water treatment may be divided into various types according to the size of the micropores (including a microfiltration membrane, an ultrafiltration membrane, a nanofiltration membrane, a reverse osmotic membrane, and the like).

These separation membranes have characteristics determined according to the characteristics of the pores formed therein. For example, a separation membrane with relatively high porosity may decrease driving pressure but may have lower physical strength. On the contrary, a separation membrane with relatively low porosity may have higher physical strength but may increase driving pressure. Additionally, the pores of such a separation membrane may be more densely distributed to facilitate selective separation of a material having a specific size.

SUMMARY

Various embodiments of the present disclosure relate to a hybrid porous structure that is capable of being regulated with relative ease regarding pore shape and structure. As a result, the hybrid porous structure can be applied to various separation membranes through which various materials targeted for separation may be separated.

Various embodiments of the present disclosure relate to a separation membrane including the hybrid porous structure.

Various embodiments of the present disclosure relate to a forward osmosis water-treatment device including the separation membrane.

Various embodiments of the present disclosure relate to a method of manufacturing the hybrid porous structure.

According to a non-limiting embodiment, a hybrid porous structure may include a base template and an ionic polymer coating layer within the base template. The base template may include a structural framework with inner surfaces defining a plurality of macropores therein. The structural framework of the base template itself may be non-porous. The plurality of macropores may correspond to a plurality of imaginary spherical bodies. Stated differently, the base template may fill the gaps among the plurality of imaginary spherical bodies stacked in three-dimensions to form an imaginary stack. The ionic polymer coating layer may be laminated on an inner surface of the base template (inside the imaginary spherical bodies). A pore may be located in a center part of each of the imaginary spherical bodies not occupied by the ionic polymer coating layer. A plurality of necks which are openings may be formed in a contact part where two adjacent imaginary spherical bodies contact each other. The necks are interconnected to the pores located in the center part of the imaginary spherical bodies.

The ionic polymer coating layer may include more than one layer and may be formed by alternatively stacking an anionic polymer coating layer and a cationic polymer coating layer.

The ionic polymer coating layer may further include an ionic salt.

The ionic polymer coating layer may be formed as a single layer or a multilayer and may include about 1 to about 1000 layers.

The ionic polymer coating layer may have an uneven surface with protrusions and depressions wherein the ionic polymers are twisted or clotted. Alternatively, the ionic polymer coating layer may have a smooth surface (e.g. a flat curved surface).

The ionic polymer coating layer may have a thickness ranging from about 1 nm to about 10,000 nm.

The neck may have an average diameter ranging from about 10 nm to about 500 nm.

The imaginary spherical bodies may have an average diameter ranging from about 1 nm to about 100 μm.

The hybrid porous structure may have porosity ranging from about 0.1 to about 95 volume %.

The imaginary spherical bodies may be stacked as a close-packed structure to form an imaginary stack.

The base template and the ionic polymer coating layer may have a volume ratio ranging from about 99:1 to about 1:6.

The base template may include a non-porous material selected from an inorganic oxide, a thermoplastic resin, a curable resin, and a combination thereof.

The hybrid porous structure may be shaped as a film or membrane having two opposing surfaces and a thickness. The actual area of each of the two surfaces may be about 1 to about 95% of the entire hypothetical planar surface. The ionic polymer coating layer within the base template may not be exposed through a side wall of the membrane.

The thickness of the film may be from about 10 nm to about 1000 μm.

According to another non-limiting embodiment, a separation membrane may be made of the hybrid porous structure.

The separation membrane may be a composite film further including a supporting layer.

The separation membrane may be a microfiltration (MF) membrane, an ultrafiltration (UF) membrane, a nanofiltration (NF) membrane, a reverse osmosis (RO) membrane, or a forward osmosis (FO) membrane.

According to still another non-limiting embodiment, a method of manufacturing the hybrid porous structure may include forming an imaginary stack by stacking a plurality of spherical body particles such that the plurality of spherical body particles contact each other in three dimensions with gaps between non-contacting surfaces of the plurality of spherical body particles. A liquid phase material is injected so as to fill the gaps between the non-contacting surfaces of the plurality of spherical body particles. The injected liquid phase material is then cured. The plurality of spherical body particles are dissolved to form a base template having macropores previously occupied by the plurality of spherical body particles, although the structural framework of the base template itself is non-porous. The inner surface of the macropores of the base template is coated with an ionic polymer solution to form an ionic polymer coating layer.

The ionic polymer coating layer may be formed as a plurality of layers by sequentially coating at least two types of the ionic polymer solutions on the inner surface of the macropores of the base template.

The coating may be selected from spin coating, dip coating, spray coating, layer-by-layer (LBL) assembly coating, or a combination thereof.

The ionic polymer solution and the liquid phase material may have a surface tension difference ranging from about 0.1 to about 60 $J/m^2$.

The ionic polymer solution may include a solvent selected from water, an alcohol-based solvent, a ketone-based solvent, a cyclic ether-based solvent, an ester-based solvent, and a combination thereof.

The ionic polymer solution may include an anionic polymer or a cationic polymer. When the ionic polymer solution includes an anionic polymer, the ionic polymer solution may have a higher pH than pKa of the anionic polymer so as to form a coating layer having an uneven surface with protrusions and depressions in which the anionic polymers are twisted or clotted. On the other hand, the ionic polymer solution may have a lower pH than pKa of the anionic polymer so as to form a coating layer with a smooth surface (e.g., flat curved surface). When the ionic polymer solution includes a cationic polymer, the ionic polymer solution may have a lower pH than pKa of the cationic polymer so as to form a coating layer having an uneven surface with protrusions and depressions in which the cationic polymers are twisted or clotted. On the other hand, the ionic polymer solution may have a higher pH than pKa of the cationic polymer so as to form a coating layer with a smooth surface (e.g., flat curved surface).

According to yet another non-limiting embodiment, a forward osmosis water-treatment device may include a feed solution including impurities for purification; a draw solution with a higher osmotic pressure than the feed solution; a separation membrane contacting the feeding solution on one side and the draw solution on the other side; a separating system configured to separate a draw solute from the draw solution downstream from the separation membrane; and a connector configured to inject the draw solute separated from the draw solution back into the portion of the draw solution contacting the separation membrane.

The forward osmosis water-treatment device may further include an outlet configured to output treated water after separating the draw solute by the separating system from the draw solution. The treated water includes water that has passed through the separation membrane from the feed solution into the draw solution due to osmotic pressure.

DETAILED DESCRIPTION

Figure 1:
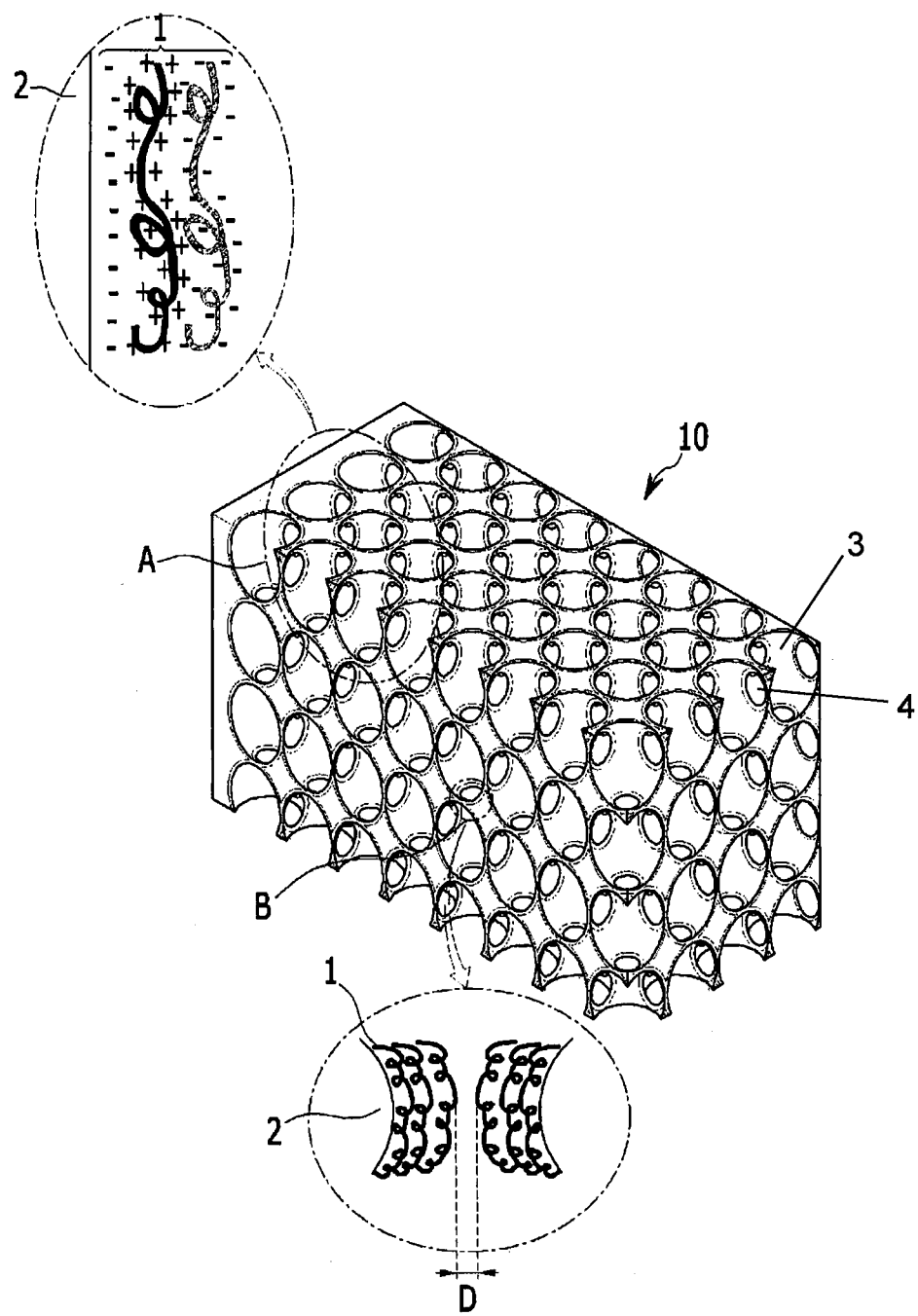
FIG. 1 is a schematic view of a hybrid porous structure according to a non-limiting embodiment of the present disclosure.

This disclosure will be described more fully hereinafter in the following detailed description. It should be understood that this disclosure may be embodied in many different forms and is not to be construed as limited to the embodiments set forth herein.

As those skilled in the art would realize, the described embodiments may be modified in various different ways, all without departing from the spirit or scope of this disclosure. The size and thickness of each constituent element as shown in the drawings may have been exaggerated to facilitate a better understanding and ease of description, and this disclosure is not necessarily limited to as shown.

It will be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, e.g., "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms, "comprises," "comprising," "includes," and/or "including," if used herein, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art. It will be further understood that terms, including those defined in commonly used dictionaries, should be interpreted as having a meaning that is consistent with their meaning in the context of the relevant art and will not be interpreted in an idealized or overly formal sense unless expressly so defined herein.

According to a non-limiting embodiment, a hybrid porous structure may include a base template and an ionic polymer coating layer within the base template. The base template may include a structural framework with inner surfaces defining a plurality of macropores therein, although the structural framework itself is non-porous. That being said, the base template may be referred to herein as a non-porous template. The plurality of macropores may correspond to a plurality of imaginary spherical bodies. Stated differently, the base template may fill the gaps among the plurality of imaginary spherical bodies stacked in three-dimensions in the form of an imaginary stack. The ionic polymer coating layer may be laminated on an inner surface of the base template inside the imaginary spherical bodies.

The term "spherical body" mentioned in the specification refers to a sphere-like shape as well as a perfect sphere when a hybrid porous structure is manufactured in a method described later.

When two imaginary spherical bodies contact each other, a pore or opening is formed in a contact part where they contact and is referred to as a "neck" in the specification. The hybrid porous structure includes a plurality of the necks. Theoretically, two perfect spherical shapes contact at a contact point, but in this case, the neck may be filled with the ionic polymer and disappear when the ionic polymer coating layer is formed inside the perfect spherical shapes. Accordingly, a neck with a predetermined size may be formed when the two imaginary spherical bodies are slightly compressed together to deform to contact each other in a larger area, or do not have perfect spherical shapes as aforementioned, and thus form a contact plane.

According to a non-limiting embodiment, the hybrid porous structure may be formed of an inverse opal-shaped non-porous template having macropores and an ionic polymer coating layer coated inside the macropores.

Accordingly, the imaginary spherical body has a pore in the center part, and the neck is interconnected to the pore in the center part of the imaginary spherical body.

The hybrid porous structure may be applied to a separation membrane. There are various kinds of separation membranes having various pore sizes. In this regard, the size of the neck may be regulated to provide various kinds of membranes. For example, the neck may have an average diameter ranging from about 10 nm to about 500 nm. The hybrid porous structure may be applied to, for example, a microfiltration (MF) membrane, an ultrafiltration (UF) membrane, a nanofiltration (NF) membrane, a reverse osmosis (RO) membrane, a forward osmosis (FO) membrane, and the like.

The ionic polymer coating layer may be formed of an anionic polymer or a cationic polymer. The ionic polymer may improve chemical reaction or physical bonding characteristics with a material for separation, and increases its selectivity on a target material. For example, a cationic polymer may be used to separate a multivalent positive ion by charging the pore surface inside the hybrid porous structure with a positive ion to increase repulsion among the positive ions.

Different kinds of the ionic polymers have different chemical/physical characteristics, and thus may be used to control the structures and shapes of laminates of the ionic polymer coating layer in a hybrid porous structure and also to control electrical charge characteristic or other chemical characteristics on the surface of the ionic polymer coating layer with an ease.

According to a non-limiting embodiment, the ionic polymer coating layer may have a plurality of layers in which an anionic polymer coating layer and a cationic polymer coating layer may be alternatively laminated. Accordingly, thickness of the ionic polymer coating layer may be controlled by changing the number of the layers, and accordingly the size of a neck may be controlled. For example, the coating layer may be a multilayer which has about 1 to about 1000 layers. In particular, the coating layer may have about 10 to about 500 layers, and more particularly, about 20 to about 200 layers. As another example, the ionic polymer coating layer may have a thickness ranging from about 1 nm to about 10,000 nm. In particular, the ionic polymer coating layer may have a thickness ranging from about 10 nm to about 5000 nm, and more particularly, about 50 nm to about 1000 nm. As aforementioned, different kinds of membranes may have an appropriate neck size by controlling the number of coating layers laminated and thickness thereof.

The ionic polymer may include a polymer electrolyte, and further, any well-known ionic polymer material without limitation. For example, the anionic polymer may be poly(styrene sulfonate), poly(acrylic acid), poly(ethylene oxide), poly(vinylsulfate), poly(3-sulfopropylmethacrylate), poly(vinylsulfonate), poly(2-acrylamido-2-methyl-1-propane sulfonic acid), poly-L-glutamate, poly(vinylphosphonic acid), poly (anethole sulfonic acid), and the like, or a combination thereof, but is not limited thereto. The cationic polymer may be poly(acrylamide), poly(ethyleneimine), poly(vinylamine), poly(diallyldimethyl ammonium), poly(arylamine hydrochloride), poly(acrylamide-co-diallyldimethyl ammonium), polyaniline, and the like, or a combination thereof, but is not limited thereto. However, the ionic polymer may include various materials such as cationic or anionic DNA, which can be laminated through static electrical attraction, hydrogen bonds, and the like.

The ionic polymer may have various surface shapes of a coating layer depending on the kinds of the ionic polymer, coating conditions, and the like. For example, the ionic polymer coating layer may have a surface with protrusions and depressions like a grape cluster, or of a flat curved surface formed along the internal curved surface of the macropores of the inverse opal shaped non-porous template. The grape-cluster-like surface with protrusions and depressions may be formed due to the increased inner free volume when the ionic polymer chains are more twisted or due to coagulation caused by a relatively low electric charge characteristic on the surface. These surface shapes depending on coating conditions may be described in more detail later in a method of manufacturing the hybrid porous structure.

The ionic polymer coating layer may further include an ionic salt. The ionic salt may impart more ionic charges to the ionic polymer coating layer. The ionic salt may include, for example, an anionic complex such as a metal halide, a carbonate, a nitrate, and the like, but is not limited thereto.

FIG. 1 is the schematic view of the hybrid porous structure. Referring to FIG. 1, an ionic polymer coating layer 1 is coated on the surface of a non-porous template 2 (refer to an enlarged part A marked with a dotted line), and the non-porous template 2 internally includes pores 3 and necks 4 (refer to an enlarged part B marked with a dotted line). Referring to FIG. 1, D in the enlarged part B marked with a dotted line indicates the diameter of a neck.

As shown in FIG. 1, a non-porous template 2 may be formed by filling a gap among a plurality of imaginary spherical bodies stacked in three-dimensions to form an imaginary stack. The imaginary spherical bodies may be stacked as a close-packed structure. For example, the imaginary stack may be an opal structure. The opal structure is formed by closely packing spherically-shaped structures with a predetermined size. The closest-packing structure may include, for example, a hexagonal close-packing (hcp) structure and a face-centered cubic (fcc) structure. However, the imaginary spherically-shaped structure may not have the same shape with a predetermined size as aforementioned. Accordingly, two imaginary spherically-shaped structures may form a neck, that is, a pore, in a region where the two imaginary spherically-shaped structures contact as aforementioned.

The size of the pores 3 may be changed by controlling the size of the imaginary spherical bodies, the thickness of the ionic polymer coating layer 1, and the like. Accordingly, the porosity of the hybrid porous structure 10 may be controlled by controlling the diameter (D) of the necks 4 (refer to FIG. 1) as well as controlling the size of the pores as aforementioned. When the hybrid porous structure 10 with appropriate porosity is applied, the separation membrane may work at a low pressure.

The imaginary spherical bodies may have various sizes and be variously stacked into the imaginary stack according to a volume ratio between the non-porous template 2 and the ionic polymer coating layer 1, water separation characteristic of a separation membrane to be applied, the desired size of the pores 3, the desired diameter of the necks 4, and the like. For example, the imaginary spherical bodies may be sequentially stacked in order of smaller to bigger or bigger to smaller size along the stacking layers. For another example, the imaginary spherical bodies used to form an imaginary stack may have a diameter distribution in a range of '1≤the biggest diameter/the smallest diameter ≤20'.

In particular, the imaginary spherical bodies may have an average diameter ranging from about 1 nm to about 100 μm, and in particular, about 10 nm to about 10 μm. More particularly, the imaginary spherical bodies may have an average diameter ranging from about 100 nm to about 1 μm.

For example, the hybrid porous structure 10 may include the non-porous template 2 and the ionic polymer coating layer 1 in a volume ratio ranging from about 99:1 to about 1:6. In particular, the non-porous template 2 and the ionic polymer coating layer 1 may have a volume ratio ranging from about 90:1 to about 1:5, and more particularly, about 80:1 to about 1:4.

The hybrid porous structure may have the porosity ranging from about 0.1 to about 95 volume %. In particular, the hybrid porous structure may have porosity ranging from about 0.5 to about 90 volume %, and more particularly, about 1.0 to about 80 volume %.

The hybrid porous structure 10 may have imaginary spherical bodies each of which is connected in three-dimensions through the necks 4, which complements the drawback of a three-dimensionally connected structure. Accordingly, the hybrid porous structure 10 may have beneficial effects on separating a target material with a particular size, when applied to a separation membrane.

The non-porous template 2 may be formed of any non-porous material capable of being applied to a method of manufacturing the hybrid porous structure 10 described later, as well as one that maintains desirable mechanical strength of the hybrid porous structure 10. According to the method of manufacturing the hybrid porous structure 10, colloid particles are stacked to form a three-dimensional stacked structure, a gap among the colloid particles is filled to form a non-porous region, and the colloid particle stacked structure is removed to form a non-porous template 2 having macropores. Accordingly, a material for forming the non-porous template 2 may be capable of not being removed when the colloid particle stacked structure is removed. The material for forming the non-porous template 2 may not be limited in its kinds as long as those conditions are met, and both of an appropriate non-porous characteristic and a mechanical strength are achieved. For example, the material for forming the non-porous template 2 may be a non-porous material including an inorganic oxide, a thermoplastic resin, a curable resin, and the like.

Examples of the inorganic oxide for forming the non-porous template 2 may include titanium oxide, tin oxide, lead oxide, zirconium oxide, nickel oxide, copper oxide, yttrium (Y) oxide, magnesium oxide, calcium oxide, aluminum oxide, boron oxide, silicon oxide, zeolite, and the like, and a solution including a precursor thereof is injected into gaps among the colloid particles forming the stacked structure and cured through a sol-gel reaction, forming the non-porous template 2.

The thermoplastic resin for forming the non-porous template 2 may include polyamide, polyethylene, polyester, polyisobutylene, polytetrafluoroethylene, polypropylene, polyacrylonitrile, polysulfone, polyethersulfone, polycarbonate, polyethylene terephthalate, polyimide, polyvinylene fluoride, polyvinylchloride, cellulose acetate, cellulose diacetate, cellulose triacetate, and the like.

The curable resin for forming the non-porous template 2 may include a thermosetting resin, a photocurable resin, and a combination thereof. The thermosetting resin and the photocurable resin may respectively include any well-known thermosetting resin or photocurable resin without any limitation. In particular, the thermosetting resin may include polydimethylsiloxane (PDMS), or the photocurable resin may include an UV curable resin capable of being cured by electromagnetic waves. Examples of the UV curable resin may include polyurethane-based, polyacrylate-based, polyepoxy-based, polyurethane acrylate-based, polyester acrylate-based, polyepoxy acrylate-based, and silicon-based UV curable resins, and the like.

The thermoplastic resin mixed with a solvent or the curable resin mixed with a solvent, or a liquid thermoplastic resin or a liquid curable resin in a fusion state, may be injected to fill gaps among colloid particles forming the stacked structure, dried, cooled, or cured to form a non-porous region.

The hybrid porous structure 10 may be a hybrid porous hierarchy structure including the non-porous template 2 and an ionic polymer coating layer 1, and may be used as a nanofiltration membrane (NF) based on steric exclusion and Donnan exclusion effects, since the pores 3 and the necks 4 therein may be minutely controlled in terms of a size as aforementioned. In addition, the hybrid porous structure 10 may be effectively operated with a relatively low applied pressure and has a desirable level of mechanical stability, and thus may be used as a material for a next generation water treatment separation membrane. Besides, the hybrid porous structure 10 may be used to treat sewer/waste water, process food, separate oil, and the like by selectively separating a microorganism and an environmental material, and accordingly, may be widely applied to fiber and paper industries, water treatment, diary, agriculture, and the like.

The hybrid porous structure 10 may have a membrane shape having a thickness, a first surface, an opposing second surface, and side surfaces between the first surface and the second surface, the thickness being a distance between the first surface and the second surface. The relative actual plane area of the non-porous template 2 in each of the first and second surfaces may be about 1 to about 95% of a total hypothetical area of each of the first and second surfaces. The ionic polymer coating layer 1 may not be exposed on the side surfaces. For example, the relative plane area of the non-porous template 2 in each of the first and second surfaces may be about 10 to about 75% of a total area of each of the first and second surfaces, and in particular, about 20 to about 50% of a total area of each of the first and second surfaces.

The hybrid porous structure 10 may form a membrane having a thickness ranging from about 10 nm to about 1000 μm. The thicker the membrane of the hybrid porous structure 10 is, the higher the mechanical strength it has. However, it may need a relatively higher applied pressure. In this way, the membrane with the hybrid porous structure 10 may be controlled to be imparted with the desired characteristics for a use of a separation membrane by controlling the thickness of the membrane. For example, the membrane of the hybrid porous structure 10 may have a thickness ranging from about 100 nm to about 500 μm. In particular, it may have a thickness ranging from about 1000 nm to about 250 μm.

According to a non-limiting embodiment, a separation membrane may include the membrane of the hybrid porous structure 10.

The separation membrane may include a microfiltration (MF) membrane, an ultrafiltration (UF) membrane, a nanofiltration (NF) membrane, a reverse osmosis (RO) membrane, a forward osmosis (FO) membrane, or the like by regulating a pore structure including the pores 3 and the necks 4 depending on its use.

The separation membrane may be fabricated into a single layer or a composite layer further including a layer made of a different material. For example, the separation membrane may be a single layer made of the hybrid porous structure 10 (hereinafter, "a hybrid porous structure membrane"). On the other hand, the separation membrane as the composite layer is prepared by combining a supportive layer on the hybrid porous structure layer. The supportive layer has no limit in its shape and kind, and may be made of a material that is well-known in a related field.

When the separation membrane is a composite layer, the hybrid porous layer have the aforementioned thickness, and the supportive layer may have a thickness ranging from about 200 μm to about 500 μm, in particular, about 100 μm to about 250 μm, and more particularly, about 50 μm to about 125 μm.

The supportive layer may be appropriately fabricated depending on a microfiltration (MF) membrane, an ultrafiltration (UF) membrane, a nanofiltration (NF) membrane, a reverse osmosis (RO) membrane, or a forward osmosis (FO) membrane. The separation membrane may be fabricated into various kinds, and thus can be used to remove and separate various metal ions by using various ionic polymers included in an ionic polymer coating layer.

The supportive layer may be made from one selected from, for example, a polyacrylate-based compound, polymethacrylate-based compound, a polystyrene-based compound, a polycarbonate-based compound, a polyethylene terephthalate-based compound, a polyimide-based compound, a polybenzimidazole-based compound, a polybenzthiazole-based compound, a polybenzoxazole-based compound, a polyepoxy-based resin compound, a polyolefin-based compound, a polyphenylene vinylene compound, a polyamide-based compound, a polyacrylonitrile-based compound, a polysulfone-based compound, a cellulose-based compound, polyvinylidene fluoride (PVDF), polytetrafluoroethylene (PTFE), a polyvinyl chloride (PVC) compound, and a combination thereof.

Figure 2:
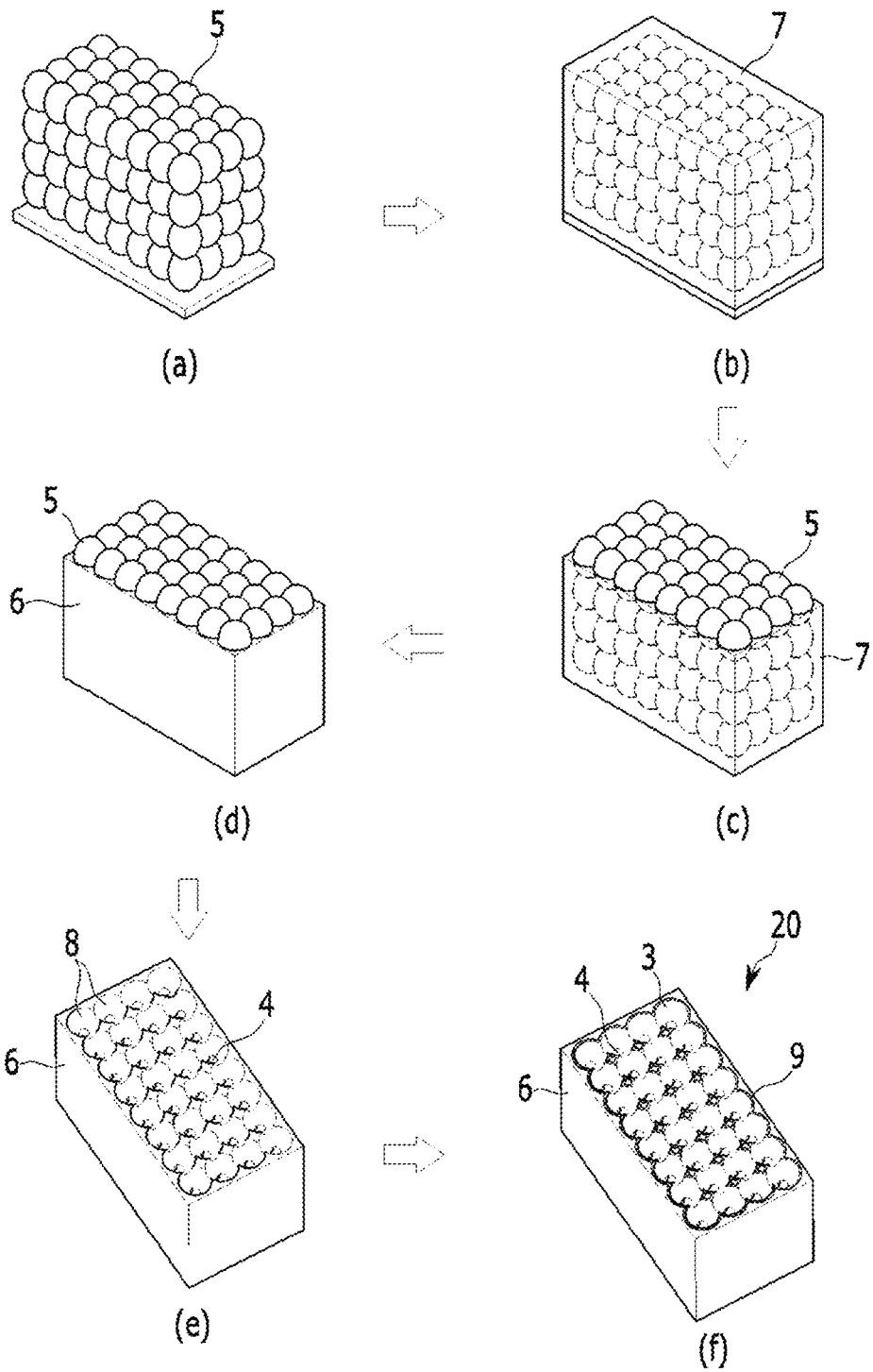
FIG. 2 schematically shows a method of preparing a hybrid porous structure according to a non-limiting embodiment of the present disclosure.

Hereinafter, a method of fabricating the hybrid porous structure is illustrated. FIG. 2 schematically shows each step of fabricating the hybrid porous structure.

The method of fabricating the hybrid porous structure 20 may include forming an imaginary stack by stacking a plurality of spherical body particles 5 such that the plurality of spherical body particles 5 contact each other in three dimensions with gaps between non-contacting surfaces of the plurality of spherical body particles; forming a non-porous template by injecting a liquid phase material 7 so as to fill the gaps between the non-contacting surfaces of the plurality of spherical body particles 5 and curing the liquid phase material 7; dissolving the plurality of spherical body particles 5 to form a non-porous template 6 having macropores 8 previously occupied by the plurality of spherical body particles 5; and coating the inner surface of the macropores 8 of the non-porous template 6 with an ionic polymer solution to form an ionic polymer coating layer 9.

First, spherical body particles 5 for forming macropores are stacked in three dimensions to form a stack. FIG. 2(a) shows that the spherical body particles 5 for forming macropores are stacked to form an opal-like stack. The spherical body particles 5 may have a size determined by pore density per unit area of a final hybrid porous structure 20. For example, the spherical body particles 5 have an average diameter ranging from about 1 nm to about 100 μm, in particular, about 10 nm to about 10 μm, and more particularly, about 100 nm to about 1 μm. The details for the spherical body particles 5 and the stack may be the same as the spherical body and the stack described to illustrate the porous region of the hybrid porous structure. For example, the spherical body particles 5 may have a size within the range and form a similar structure to an opal.

The spherical body particles 5 for forming macropores may include any material without limitation, which is capable of being selectively removed through etching after forming the non-porous template 6. For example, the spherical body particles 5 may be colloid particles to decrease a size deviation among the particles. For example, inorganic colloid particles such as $SiO_2$ or organic colloid particles such as polystyrene (PS) and polymethylmethacrylate (PMMA) may be formed into an opal-shaped structure of colloid particles having a crystal lattice in a coating method using an external stimulus such as spin coating, dip coating, sedimentation, spraying, electrophoresis, and the like; a LB (Langmuir-Blodgett) method; a mold-guide method; and the like.

A membrane-shaped hybrid porous structure may have various thicknesses by controlling the concentration of a solution which is used in the step of forming a stack of the spherical body particles 5 for forming macropores. For example, the stack formed of the spherical body particles 5 may have a thickness ranging from about 10 nm to about 1000 μm depending on the concentration of a solution including the spherical body particles 5 for forming macropores. For example, a polystyrene polymer colloid particle solution synthesized through emulsion polymerization may be prepared to have a concentration ranging from about 0.1 wt % to about 10 wt % and form an opal-shape stack with a thickness ranging from about 500 nm to about 100 μm.

Then, a liquid phase material 7 for a non-porous template is injected to fill gaps among the spherical body particles 5 of the stack (FIG. 2(b)). The liquid phase material 7 for a non-porous template may include a precursor solution of a thermoplastic resin, a curable resin, or an inorganic oxide, whose detailed description is the same as described above in the non-porous template included in a hybrid porous structure. The method of injecting the liquid phase material 7 into the non-porous template may include spin coating, capillary charging, dip coating, spraying, and the like, but is not limited thereto.

In order to fabricate a free-standing thin hybrid porous structure membrane having both sides open, that is to say, exposing a pore located in the center part of a macropore 8 and an ionic polymer coating layer 9 on both sides thereof, the liquid phase material 7 for a non-porous template is cured and partly removed toward the surface to expose the spherical body particles 5 on the surface before forming a non-porous template 6 (FIG. 2(c)). Then, the liquid phase material 7 for a non-porous template is cured to form the non-porous template 6 (FIG. 2(d)). By controlling the degree of exposure of the pore located in the center part of a macropore 8 and an ionic polymer coating layer 9 on the each side of the hybrid porous structure membrane, the relative plane area of the non-porous template 6 on the each side of the hybrid porous structure membrane may be about 1 to about 95% of a total area of each of the sides of the hybrid porous structure membrane, in particular, about 10 to about 75%, and more particularly, about 20 to about 50%.

Then, the spherical body particles 5 are selectively dissolved and removed by a solvent, forming a non-porous template 6 having spherical macropores 8 stacked in a three-dimensional structure (FIG. 2(e)). In FIG. 2(e), small circles marked in the macropores 8 indicate necks 4, which also indicates that the macropores 8 are interconnected with one another. For example, when the spherical body particles 5 are inorganic oxide colloid particles such as $SiO_2$, they may be removed by using hydrofluoric acid (HF). When the spherical body particles 5 are organic colloid particles such as polystyrene, they may be removed by an organic solvent such as toluene and the like. The kinds and sizes of the colloid particles used as the spherical body particles 5 may be regulated to control the lattice size of the macropores 8, the size of the necks 4 of the non-porous template 6, and the like.

Next, an ionic polymer coating layer 9 is coated inside the macropores 8 of the non-porous template 6, fabricating a hybrid porous structure 20 having a hierarchy structure (FIG. 2(f)).

The ionic polymer coating layer 9 is formed by coating an ionic polymer melted solution or a diluted solution in a method such as spin coating, dip coating, spray coating, layer-by-layer (LBL) assembly coating, and the like. The coating may be repeatedly performed to form a plurality of layers of the ionic polymer coating layer 9.

The layer-by-layer (LBL) assembly coating method may from a functional multi-layered thin membrane by alternatively combining a polymer electrolyte, nanoparticles, large organic molecules, and the like having a positive ion charge with another polymer electrolyte, nanoparticles, large organic molecules, and the like having a negative ion charge through molecular attraction such as static electrical attraction, hydrogen bonding, and electron transfer.

A pair of ionic polymers having opposite charges is coated in a layer-by-layer (LBL) assembly coating method based on static electrical mutual attraction to uniformly form a thin layer with desired thickness and properties.

Figure 3:
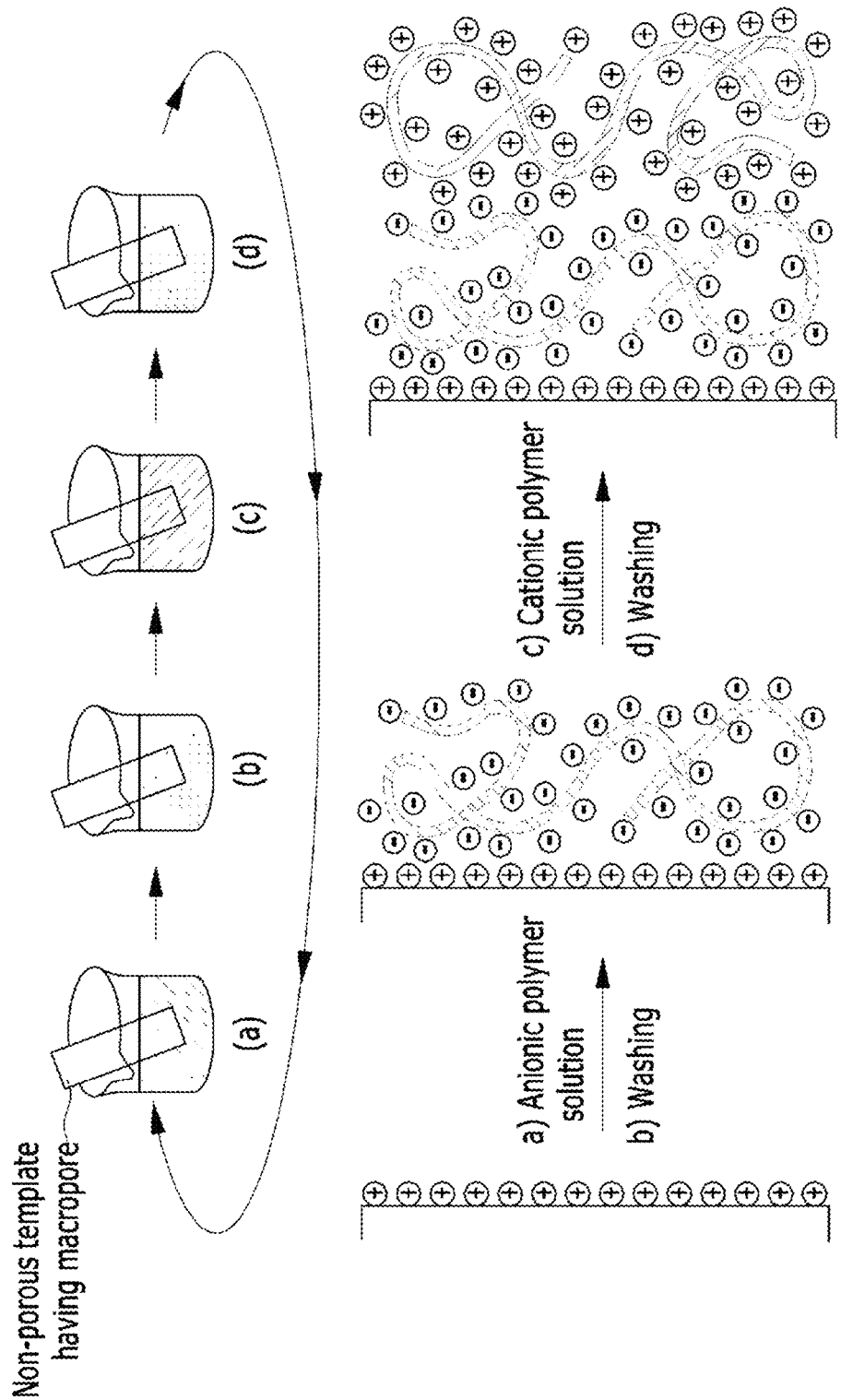
FIG. 3 schematically shows a method of forming an ionic polymer coating layer on the inner surface of the base template in a layer-by-layer (LBL) assembly coating method according to a non-limiting embodiment of the present disclosure.

FIG. 3 schematically shows a method of forming the ionic polymer coating layer 9 in the layer-by-layer (LBL) assembly coating method. Referring to FIG. 3, the non-porous template 6 having macropores 8 as aforementioned is dipped in an anionic polymer solution to form (a) an anionic polymer coating layer and is washed to remove excess anionic polymer solution. Next, the template including the anionic polymer coating layer is dipped in a cationic polymer solution again to form (b) a cationic polymer coating layer and washed to remove excess cationic polymer solution. The processes (a) and (b) are repeated (c and d) to sequentially coat additional anionic and cationic polymer coating layers. The laminating count of proceeding the processes (a) and/or (b) may be controlled so as to obtain multiple coating layers with a desired thickness.

The layer-by-layer (LBL) assembly coating method is a sequential sedimentation coating method of coating ionic polymer materials of opposite charges to form multiple layers, and may control the size of the necks 4. For example, the necks in a hybrid porous structure 20 may have an average diameter ranging from about 10 nm to about 500 nm. In other words, the thickness of the ionic polymer coating layer may be controlled by regulating the number of layers, and thus the size of the necks can be controlled. For example, the coating layer may have about 1 to about 1000 layers, in particular, about 10 to about 500 layers, and more particularly, about 20 to about 200 layers. For another example, the ionic polymer coating layer may have a thickness ranging from about 1 to about 10000 nm, in particular, about 10 nm to about 5000 nm, and in more particular, about 50 nm to about 1000 nm. As aforementioned, the necks may have an appropriate size depending on kinds of a separation membrane by regulating the number of coating layers and thickness thereof.

In addition, the details of an ionic polymer are the same as aforementioned. The laminated structure and the shape inside the macropores 8 in the non-porous template 6 may be regulated depending on the physical/chemical characteristics of the different kinds of ionic polymers, and thus electrical charge characteristic or other chemical characteristics on the surface of an ionic polymer coating layer 9 can be easily controlled.

Laminating the ionic polymer coating layer 9 inside the macropores 8 of the non-porous template 6 may be facilitated by selecting an appropriate solvent. When the ionic polymer solution and the liquid phase material 7 for a non-porous template have similar surface tensions, the ionic polymer solution may have better an impregnation characteristic and thus makes it easy to be coated and bring about a uniform coating inside the macropores 8 in the non-porous template 6. For example, the ionic polymer solution and the liquid phase material 7 for forming a non-porous region may have a surface tension difference ranging from about 0.1 to about 60 $J/m^2$. In particular, the ionic polymer solution and the liquid phase material 7 for forming a non-porous region may have a surface tension difference ranging from about 0.5 to about 50 $J/m^2$, and more particularly, about 1 to about 40 $J/m^2$. The ionic polymer solution may include a solvent selected to satisfy the surface tension difference range. For example, when the aforementioned liquid phase material 7 for a non-porous template is used, for example, a solvent for the ionic polymer solution may be an alcohol-based solvent such as water and isopropylalcohol, a ketone-based solvent such as acetone and the like, a cyclic ether-based solvent such as tetrahydrofuran (THF), an ester-based solvent such as ethyl acetate, and a combination thereof so as to improve a impregnation characteristic of an ionic polymer solution on the surface of the macropores 8 of the non-porous template 6, that is, on the interface between the non-porous template 6 and the ionic polymer coating layer 9. According to a non-limiting embodiment, a mixed solvent prepared by mixing alcohol and water in an appropriate ratio may lower the interface energy on the surface of the macropores 8 of the non-porous template 6.

The ionic polymer coating layer 9 may have various surfaces depending on conditions of an ionic polymer solution used in a coating process. For example, an ionic polymer coating layer with various structures and shapes may be formed by controlling the kinds of a pair of anionic and cationic polymers, polar characteristic of an ionic polymer solution, and the like to affect the intensity of chain bonds. Accordingly, the hybrid porous structure may be used as a nanofiltration membrane (NF) based on steric exclusion and Donnan exclusion effects by minutely controlling the pore size.

For example, when the ionic polymer solution includes an anionic polymer, for example, an anionic polymer solution having a higher pH than pKa of the anionic polymer, the ionic polymer coating layer 9 has protrusions and depressions on the surface in which the anionic polymer is chain-twisted or clotted.

On the other hand, when the anionic polymer solution has a lower pH than pKa of the anionic polymer, the ionic polymer coating layer 9 may have a flat-curved surface along the curve of the flat macropores 8.

However, a cationic polymer is opposite to the anionic polymer. When the ionic polymer solution including a cationic polymer has a lower pH than pKa of the anionic polymer, the ionic polymer coating layer 9 may have a surface with protrusions and depressions, wherein the anionic polymer is chain-twisted or clotted.

On the other hand, when the cationic polymer solution has a higher pH than pKa of the anionic polymer, the ionic polymer coating layer 9 may have a curved surface along the curve of the flat macropores 8.

In this way, the pH of the ionic polymer solution may be changed to control the shape of an ionic polymer coating layer 9 inside a hybrid porous structure.

The hybrid porous structure 20 is fabricated in a bottom-up method in which the non-porous template 6 including the macropores 8 is first formed, and then the ionic polymer coating layer 9 is coated inside the macropores 8. The bottom-up method may more minutely regulate a selective and functional structure than a conventional top-down method of forming nanopores inside a supporter material through a physical/chemical process, and thus may be easily applied to manufacture a hybrid porous structure with a large area and industrial fabrication of a thickness of tens of micrometers.

According to a non-limiting embodiment, a forward osmosis water-treatment device may include a feeding solution (also referred to as a feed solution) including impurities requiring purification; a draw solution having a higher osmotic pressure than the feeding solution; the separation membrane contacting the feeding solution on one side and the draw solution on the other side; a recovery system recovering a draw solute from the draw solution; and a connector sending back the draw solute to the draw solution contacting the separation membrane.

The forward osmosis water-treatment device may further include an outlet configured to output the treated water after separating a draw solute by the separating system from the draw solution. The treated water includes water that has passed through the separation membrane from the feeding solution into the draw solution due to osmotic pressure.

In the forward osmosis water-treatment device, the separation membrane may be as previously described. Herein, the separation membrane may be appropriately fabricated to allow use in a forward osmosis process.

Figure 4:
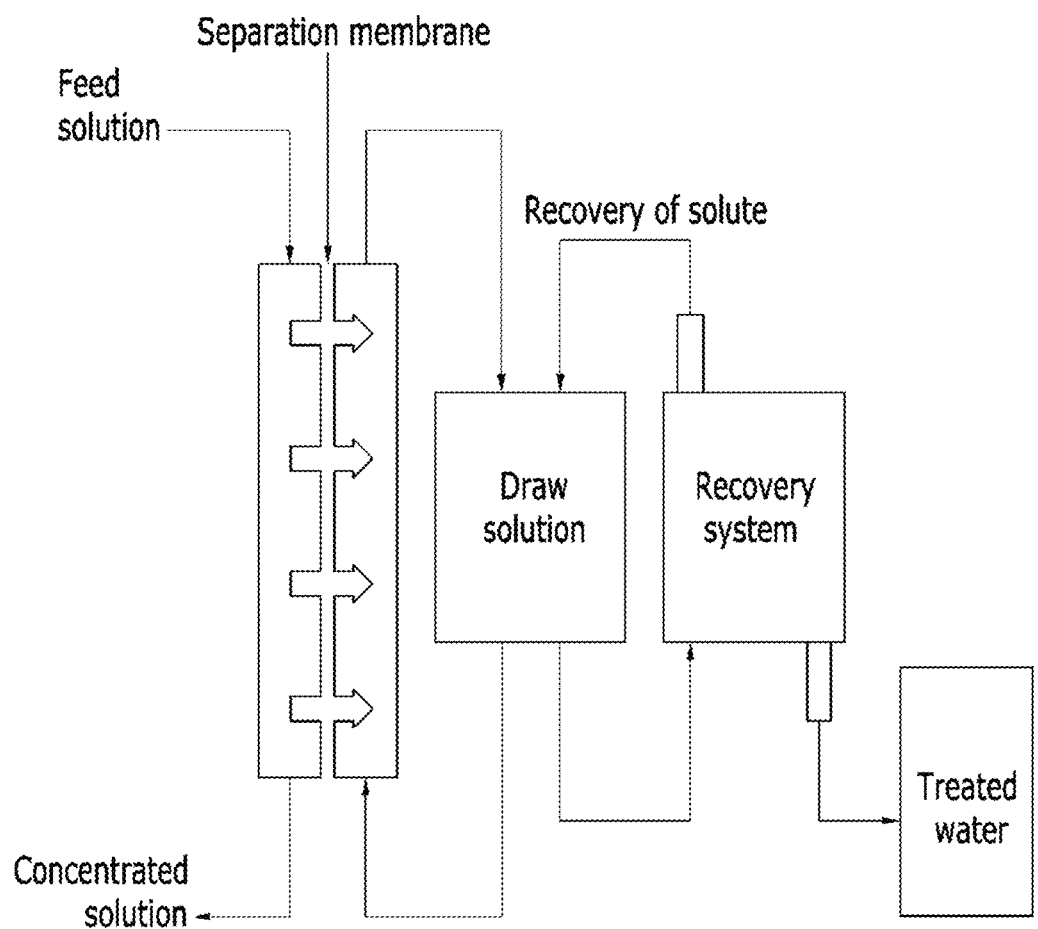
FIG. 4 is a schematic view of a forward osmosis water-treatment device according to a non-limiting embodiment of the present disclosure.

The forward osmosis water-treatment device is operated by transporting water in a feeding solution through a separation membrane toward a draw solution with a higher concentration by using osmotic pressure, transporting the draw solution including the water to a recovery system and separating a draw solute from the draw solution including the water, which have passed through the separation membrane from the feeding solution thereto, and outputting the remains after separating a draw solute by the separating system as treated water. In addition, the recovered draw solute contacts a feeding solution and may be reused. FIG. 4 schematically shows the operation mechanism of a forward osmosis water-treatment device.

The recovery system may include a separation unit separating a draw solute from a draw solution.

The forward osmosis process may produce fresh water by using a draw solution with a higher concentration than a feeding solution, transporting water molecules from the feeding solution to the draw solution, separating a draw solute from the draw solution, reusing the draw solute, and produce the treated water.

The feeding solution may include sea water, brackish water, waste water, tap water for drinking water, and the like.

For example, the forward osmosis device may be used for water purification, waste water treatment and reuse, sea water desalination, and the like.

Hereinafter, the embodiments are illustrated in more detail with reference to examples. However, the following are exemplary embodiments and are not limiting.

EXAMPLE

Example 1

First, 800 nm-sized polystyrene nanoparticles are used to form an opal-like structure with a highly-developed crystal lattice in a sedimentation method. Then, polyurethane acrylate is injected into the opal-like structure (also referred to as an opal-shaped structure) in a spin coating method (1000 rpm, 5 min). In order to form an inverse opal-shaped free-standing thin membrane with both sides open, the surface of the opal-shaped structure is planarized by performing a spin coating method (1000 rpm, 60 sec) three times with ethanol (20 v/v %, deionized water (DI)) and removing the excess polyurethane acrylate existing on the surface thereof. Then, the inverse opal-shaped free-standing thin membrane is cured for about 2 hours and 30 minutes under ultraviolet (UV) exposure to prepare a polyurethane acrylate non-porous template with an inverse opal shape. The polyurethane acrylate non-porous template with an inverse opal shape is supported in toluene for about one hour to remove polystyrene thereinside, fabricating an inverse opal-shaped non-porous template including macropores.

Next, a cationic polymer solution is prepared by dissolving polyallylamine hydrochloride (PAH) as a cationic polymer in a 20 mM concentration in a mixed solvent prepared by mixing deionized water and isopropyl alcohol in a ratio of about 8:2 v/v.

On the other hand, an anionic polymer solution is prepared by dissolving polystyrene sulfonate (PSS) as an anionic polymer in a 20 mM concentration in a mixed solvent prepared by mixing deionized water and isopropyl alcohol in a ratio of about 8:2 v/v.

Then, the aforementioned inverse opal-shaped non-porous template including macropores is supported in the cationic polymer solution in a beaker for about 8 minutes and washed three times on the surface for about one minute, and then supported in the cationic polymer solution in another beaker for about 8 minutes and washed three times on the surface for about one minute, forming an ionic polymer coating layer. The coating process is repeatedly performed to obtain a desired thickness by alternatively laminating a cationic polymer layer and an anionic polymer layer. The following Table 1 shows pKa and pH of the cationic polymer solution and the anionic polymer solution, and the number of ionic polymer layers. The ionic polymer coating layers are respectively formed in a range of about 10 layers and about 40 layers.

Figure 5A:
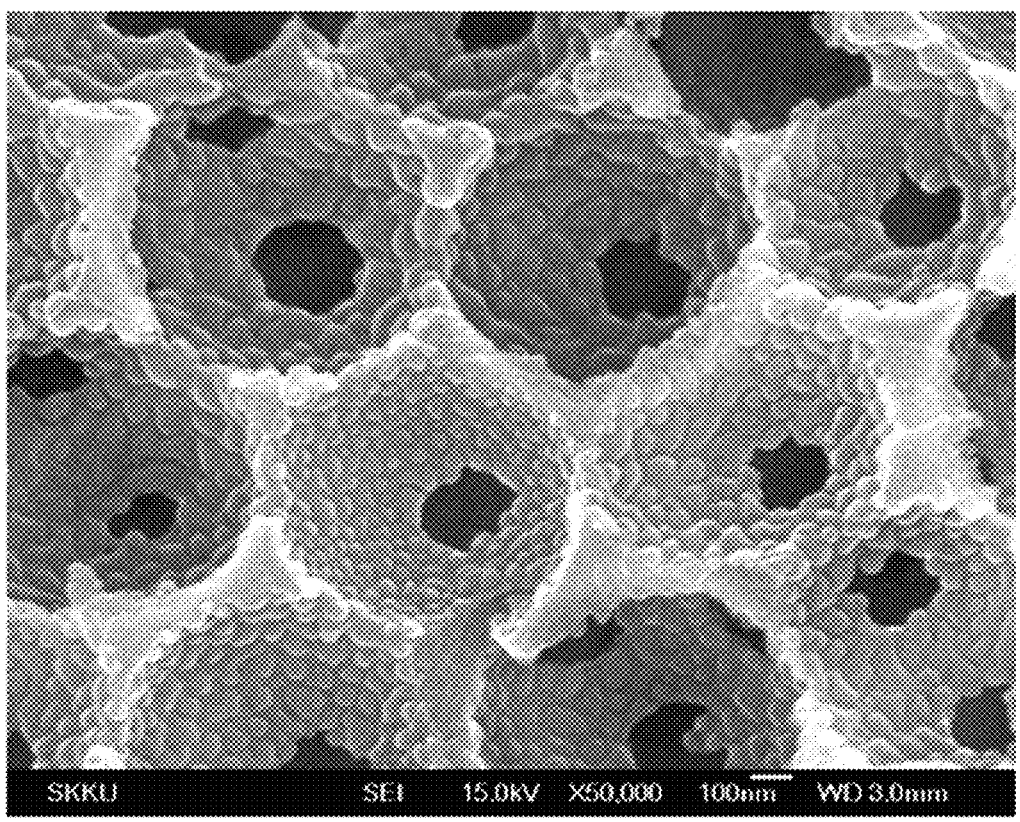
FIGS. 5A to 10 are cross-sectional scanning electron microscope (SEM) photographs of a hybrid porous structure according to various examples of the non-limiting embodiments of the present disclosure.
Figure 5B:
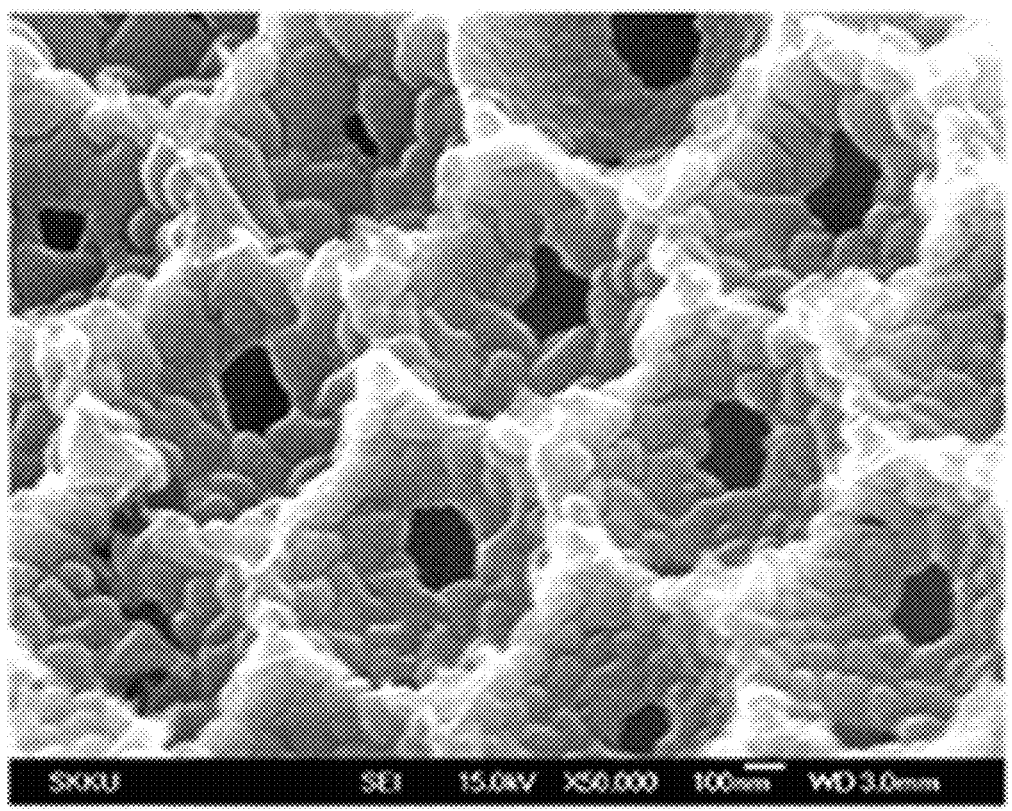

FIG. 5(a) provides a SEM photograph of a hybrid porous structure having ionic polymer coating layer of laminate of about ten layers, while FIG. 5(b) is a SEM photograph of a hybrid porous structure with ionic polymer coating layer of laminate of about forty layers.

Example 2

A hybrid porous structure membrane is fabricated according to the same method as Example 1, except for changing pH of the cationic and anionic polymer solutions and the number of the ionic polymer layers as provided in the following Table 1. The ionic polymer coating layers are respectively formed as laminates of a range of about 60 to about 70 layers.

Figure 6A:
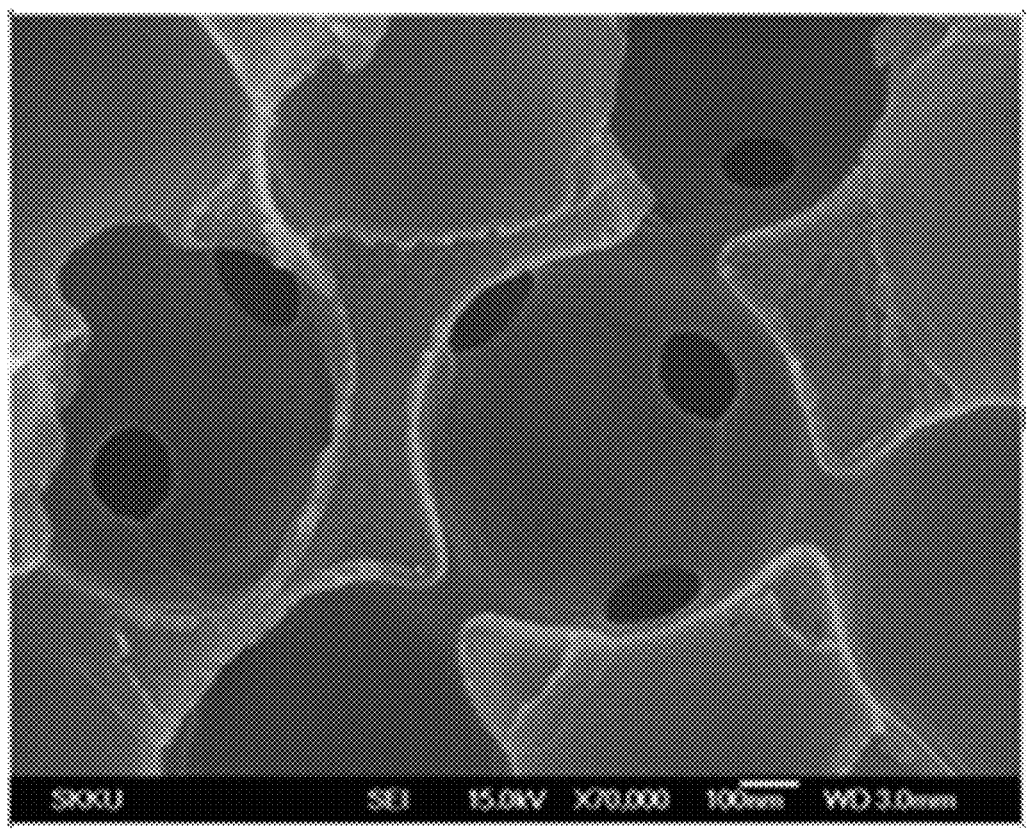
Figure 6B:
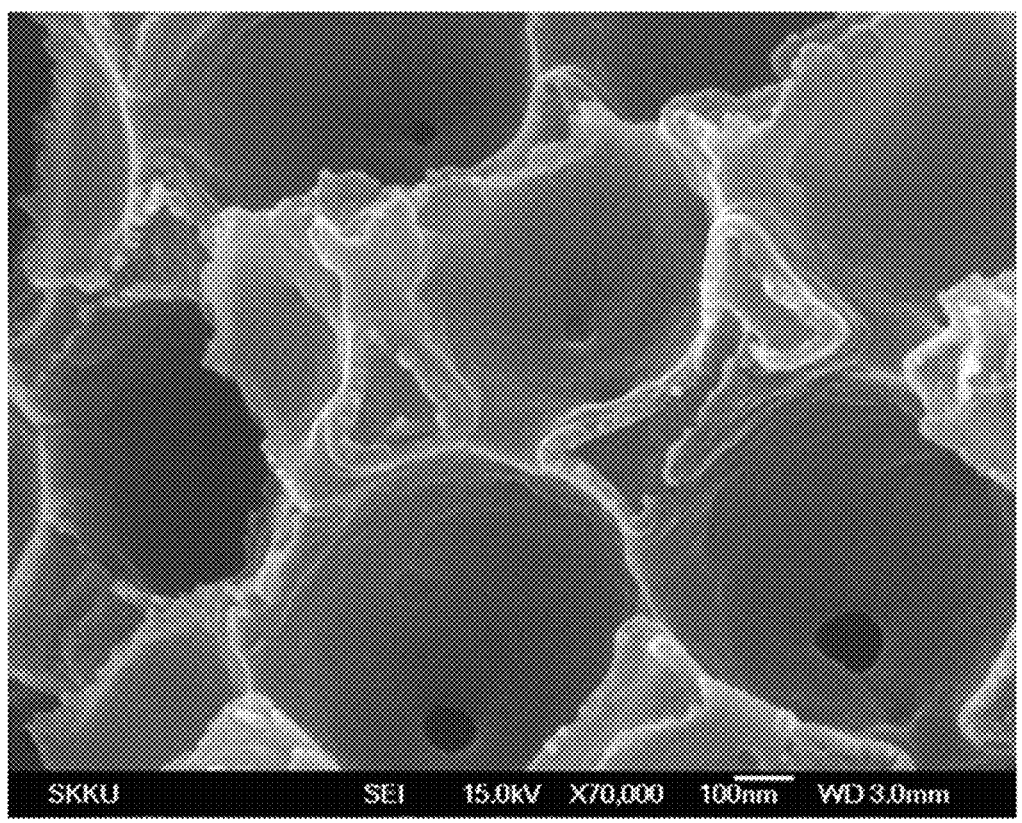

FIG. 6(a) provides a cross-sectional SEM photograph of a hybrid porous structure having ionic polymer coating layer of laminate of about 60 layers, while FIG. 6(b) provides a cross-sectional SEM photograph of a hybrid porous structure having ionic polymer coating layer of laminate of about 70 layers.

Example 3

A hybrid porous structure is fabricated according to the same method as Example 1, except for changing the pH of the cationic and anionic polymer solutions and the number of laminate of layers of an ionic polymer layer as provided in the following Table 1.

Figure 7:
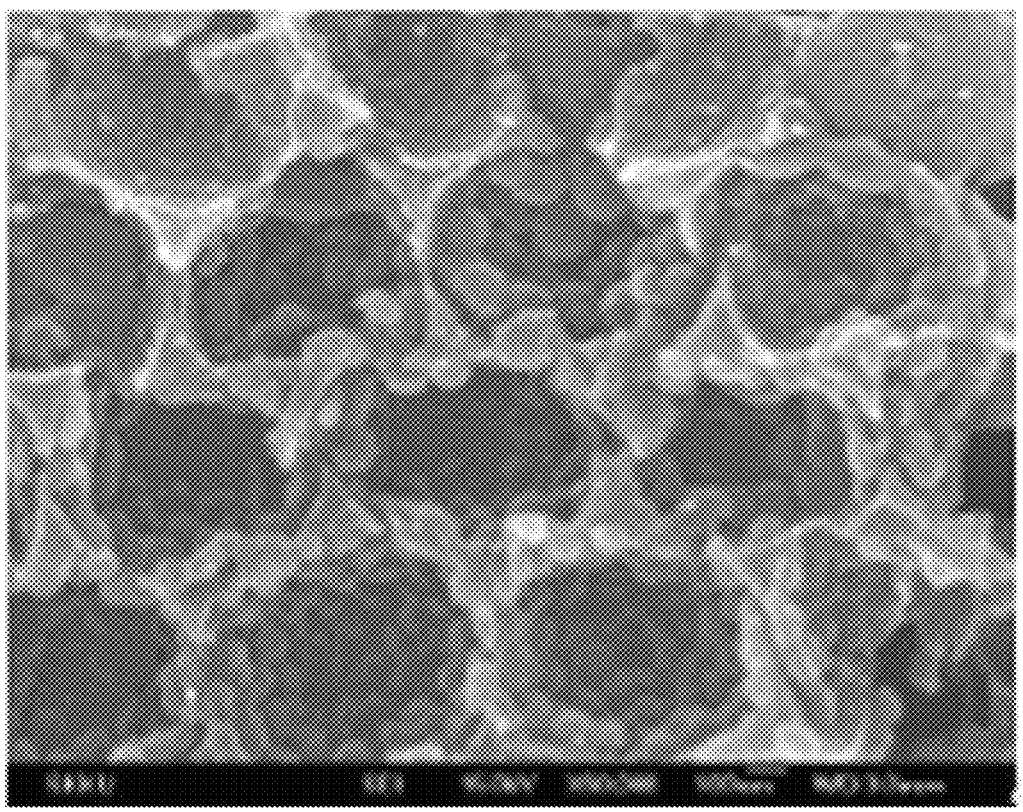

FIG. 7 provides a cross-sectional SEM photograph of the hybrid porous structure.

Example 4

A hybrid porous structure is fabricated according to the same method as Example 1, except for changing the pH of the cationic and anionic polymer solutions and the number of laminate of layers of an ionic polymer layer as provided in the following Table 1.

Figure 8:
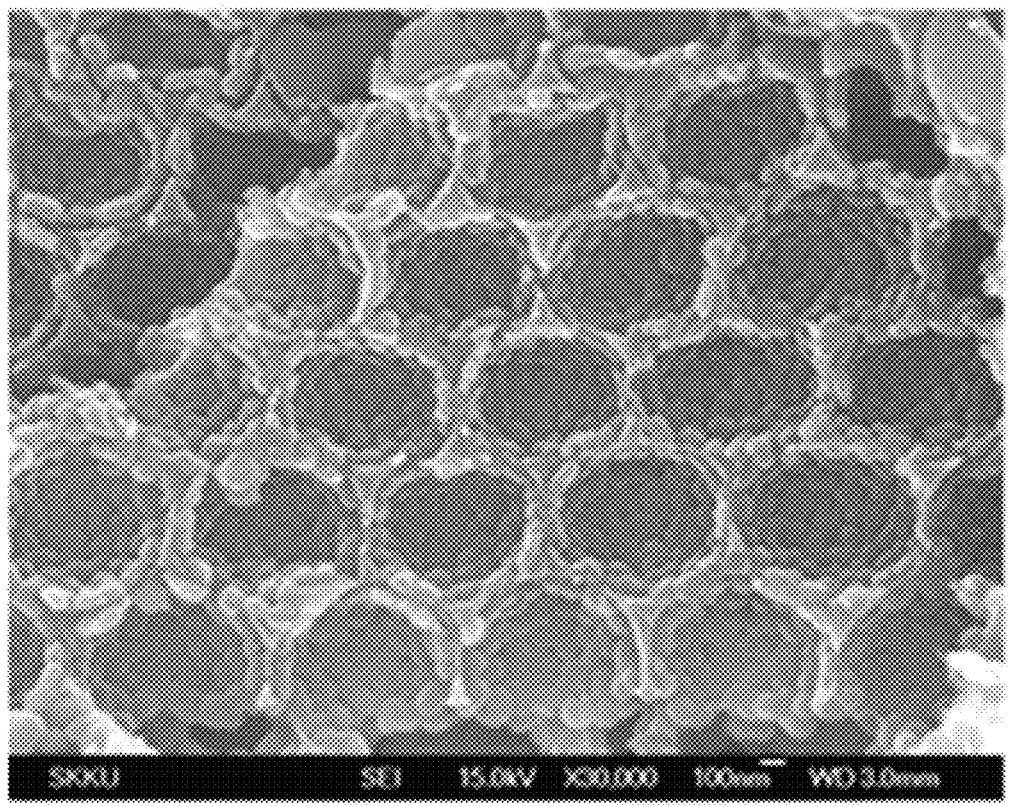

FIG. 8 provides the cross-sectional SEM photograph of the hybrid porous structure.

Example 5

A hybrid porous structure is fabricated according to the same method as Example 1, except for changing the pH of the cationic and anionic polymer solutions and the number of laminate of layers of an ionic polymer layer as provided in the following Table 1.

Figure 9:
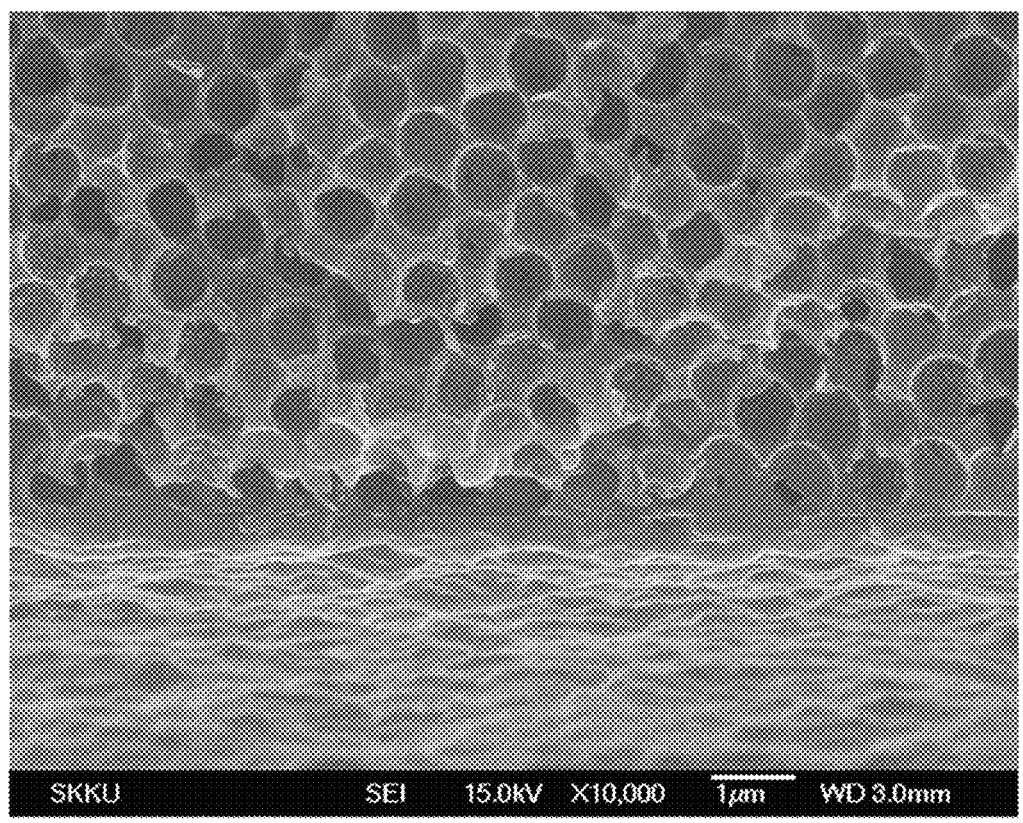

FIG. 9 provides a cross-sectional SEM photograph of the hybrid porous structure.

Example 6

A hybrid porous structure is fabricated according to the same method as Example 1, except for changing the pH of the cationic and anionic polymer solutions and the number of laminate of layers of an ionic polymer layer as provided in the following Table 1. Herein, a NaCl solution as an ionic salt is mixed with the ionic polymer solutions in a concentration as provided in the following Table 1.

Figure 10:
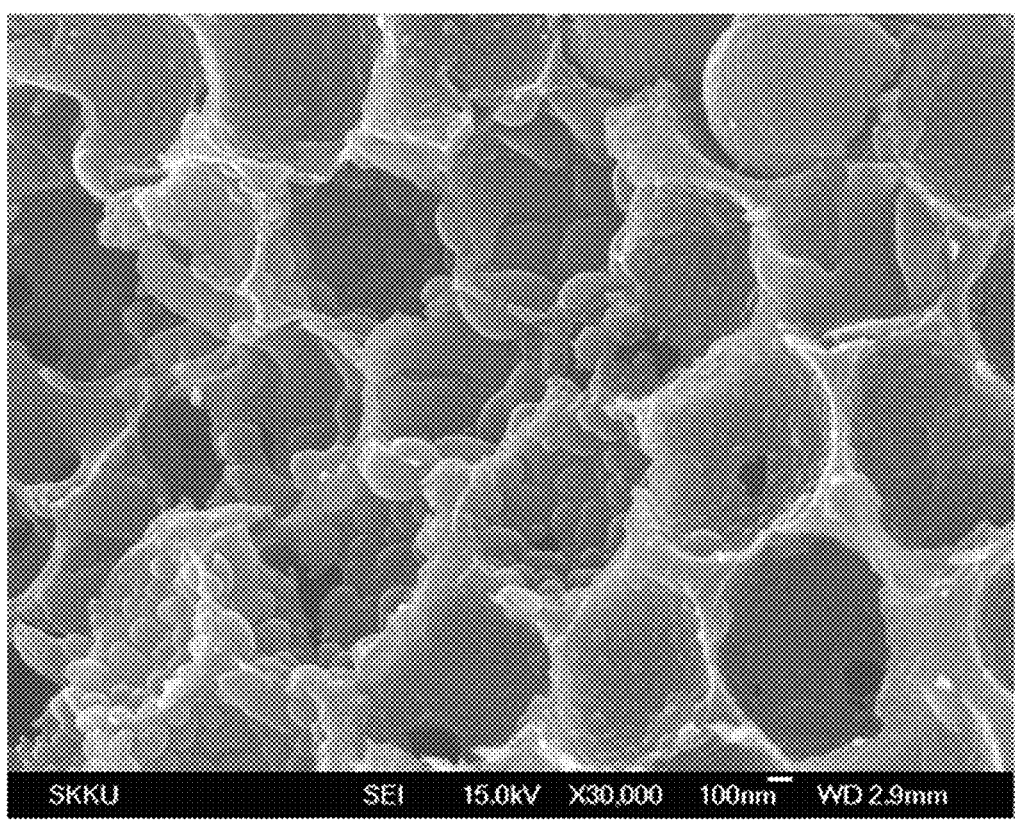

FIG. 10 provides the cross-sectional SEM photograph of the hybrid porous structure.

The following Table 1 provides the surface shapes of an ionic polymer coating layer in the hybrid porous structure membranes according to Examples 1 to 6.

TABLE 1

|  | Cationic polymer/ anionic polymer | pKa (cationic polymer)/pKa (anionic polymer) | pH (cationic polymer)/pH (anionic polymer), added ionic salt | Number of ionic polymer layers | Shape of surface of ionic coating layer |
| --- | --- | --- | --- | --- | --- |
| Example 1 | PAH/PSS | 8.8/1.0 | 9.3/9.3 | 10, 40 | Grape-cluster-like shape |
| Example 2 | PAH/PSS | 8.8/1.0 | 4.5/4.5 | 60, 70 | Flat curved shape |
| Example 3 | PAH/PSS | 8.8/1.0 | 2.3/2.1 | 47 | Grape-cluster-like shape |
| Example 4 | PAH/PSS | 8.8/1.0 | 2.3/2.1 | 73 | Grape-cluster-like shape |
| Example 5 | PAH/PSS | 8.8/1.0 | 2.3/2.1 | 91 | grape-cluster-like shape |
| Example 6 | PAH/PSS | 8.8/1.0 | 2.3 (1M NaCl)/2.1 (0.5M NaCl) | 39 | Grape-cluster-like shape |

Examples 7 and 8

The hybrid porous structure films (5 μm) according to Examples 4 and 6 are respectively combined with a cellulose acetate filter (0.45 μm), fabricating a nanofiltration (NF) membrane.

Experimental Example 1

Membrane Performance

Each membrane according to Examples 7 and 8 are evaluated regarding performance by filtering a feeding solution.

A 0.01 g/L of a $CuSO_4$ aqueous solution (6 ppm $Cu^{2+}$) as a feeding solution is passed through each membrane by using a syringe pump with a predetermined pressure of about 9 kg/cm$^2$ at a speed of about 0.3 ml per minute, obtaining a treated solution.

Then, atomic absorption spectroscopy (AAS) is used to compare a $Cu^{2+}$ ion concentration difference of the feeding solution and the treated solution before and after passing through the membrane. The results are provided in the following Table 2.

TABLE 2

| | $Cu^{2+}$ ion rejection rate (%) |
|---|---|
| Example 7 | 25 |
| Example 8 | 50 |

While various embodiments are described herein, it is to be understood that the disclosure is not limited to the disclosed embodiments. Rather, the disclosure is intended to cover all modifications, variations, and equivalent arrangements included within the spirit and scope of the appended claims.

DESCRIPTION OF SYMBOLS

1: ionic polymer coating layer
2: non-porous template
3: pore
4: neck
5: spherical body particles for forming macropores
6: non-porous template
7: liquid phase material for a non-porous template
8: macropore
9: ionic polymer coating layer
10: hybrid porous structure
20: hybrid porous structure

What is claimed is:

1. A hybrid porous structure comprising:
a base template including a structural framework with inner surfaces defining a plurality of macropores therein, the plurality of macropores being spherically-shaped with a first diameter and connected to adjacent macropores through a plurality of necks, the plurality of necks being openings of a second diameter in the inner surfaces of the structural framework, the second diameter of the necks being less than the first diameter of the macropores, the structural framework of the base template being non-porous; and
an ionic polymer coating layer on the inner surfaces of the base template, the ionic polymer coating layer including 10 to 500 alternately arranged anionic polymer coating and cationic polymer coating layers.

2. The hybrid porous structure of claim 1, wherein the ionic polymer coating layer includes an ionic salt.

3. The hybrid porous structure of claim 1, wherein the ionic polymer coating layer has a smooth surface or an uneven surface, the uneven surface including protrusions and depressions where ionic polymers of the ionic polymer coating layer are chain-twisted or clotted.

4. The hybrid porous structure of claim 1, wherein the ionic polymer coating layer has a coating thickness of about 1 nm to about 10,000 nm.

5. The hybrid porous structure of claim 1, wherein the second diameter of the plurality of necks have an average ranging from about 10 nm to about 500 nm.

6. The hybrid porous structure of claim 1, wherein the first diameter of the macropores has an average ranging from about 1 nm to about 100 μm.

7. The hybrid porous structure of claim 1, wherein the hybrid porous structure has a porosity ranging from about 0.1 to about 95 volume %.

8. The hybrid porous structure of claim 1, wherein the plurality of macropores are arranged as a close-packed structure.

9. The hybrid porous structure of claim 1, wherein the base template and the ionic polymer coating layer have a volume ratio ranging from about 99:1 to about 1:6.

10. The hybrid porous structure of claim 1, wherein the base template is one selected from an inorganic oxide, a thermoplastic resin, a curable resin, and a combination thereof.

11. The hybrid porous structure of claim 1, wherein
the base template has a base thickness, a first outer surface, an opposing second outer surface, and side surfaces between the first outer surface and the second outer surface, the base thickness being a distance between the first outer surface and the second outer surface,
an actual area of the first and second outer surfaces of the base template is about 1 to about 95% of a total hypothetical area of a plane corresponding to each of the first and second outer surfaces, and
the ionic polymer coating layer within the base template is not exposed through the side surfaces.

12. The hybrid porous structure of claim 11, wherein the base thickness is about 10 nm to about 1000 μm.

13. A separation membrane comprising the hybrid porous structure according to claim 1.

14. The separation membrane of claim 13, further comprising:
a supportive layer so as to be in a form of a composite film.

15. The separation membrane of claim 13, wherein the separation membrane is a microfiltration (MF) membrane, an ultrafiltration (UF) membrane, a nanofiltration (NF) membrane, a reverse osmosis (RO) membrane, or a forward osmosis (FO) membrane.

16. A forward osmosis water-treatment device comprising:
a feed solution including impurities targeted for purification;
a draw solution having a higher osmotic pressure than the feed solution;
the separation membrane according to claim 15, the separation membrane including a first side contacting the feed solution and an opposing second side contacting the draw solution;
a separating system configured to separate a draw solute from the draw solution downstream from the separation membrane; and a connector configured to recycle the draw solute separated by the separating system back to the draw solution contacting the separation membrane.

17. The forward osmosis water-treatment device of claim 16, further comprising:

an outlet configured to output treated water after the separating system separates the draw solute from the draw solution, the treated water including water from the feed solution that has passed through the separation membrane due to the osmotic pressure.

* * * * *